United States Patent [19]

Jones

[11] 3,917,080
[45] Nov. 4, 1975

[54] METHOD AND APPARATUS FOR FORMING BRICK PACKS WITH VOIDS

[76] Inventor: Robert E. Jones, 15 S. Oak Forest Drive, Asheville, N.C. 28803

[22] Filed: Jan. 8, 1974

[21] Appl. No.: 431,636

[52] U.S. Cl.............. 214/6 A; 214/8.5 C; 214/152
[51] Int. Cl.².................. B65G 57/10; B65G 57/26
[58] Field of Search ........ 214/6 A, 6 DK, 6 F, 6 H, 214/6 FS, 6 M, 8.5 R, 8.5A, 8.5 C, 214/8.5 D, 152

[56] References Cited
UNITED STATES PATENTS

| | | | |
|---|---|---|---|
| 3,260,379 | 7/1966 | Bason | 214/6 A |
| 3,471,036 | 10/1969 | Thomas et al. | 214/6 A |
| 3,491,901 | 1/1970 | Pearne et al. | 214/6 A |
| 3,608,746 | 9/1971 | Meyer | 214/6 A |
| 3,656,635 | 4/1972 | Schafer et al. | 214/8.5 C |
| 3,834,298 | 9/1974 | Paschal | 214/6 A X |

Primary Examiner—Robert J. Spar
Assistant Examiner—Leslie J. Paperner
Attorney, Agent, or Firm—William E. Mouzavires

[57] ABSTRACT

Brick layers are taken from a kiln car and sequentially stacked on an elevator until a predetermined number of layers have been stacked on the elevator. A fluid actuated pusher then moves the bricks pack horizontally from the elevator onto a shuttle car which then is indexed to a strap feeding station where another fluid actuated pusher moves the stack horizontally from the shuttle car into the inlet of a strapping station where the stack is bundled with steel strapping in conventional fashion. After the stack is initially deposited at the inlet of the strapping station, a strap feed pusher vertically descends behind the stack and advances it further towards the strap station to clear the shuttle car which is then indexed back to its initial position adjacent the elevator for repeating the operation.

14 Claims, 8 Drawing Figures

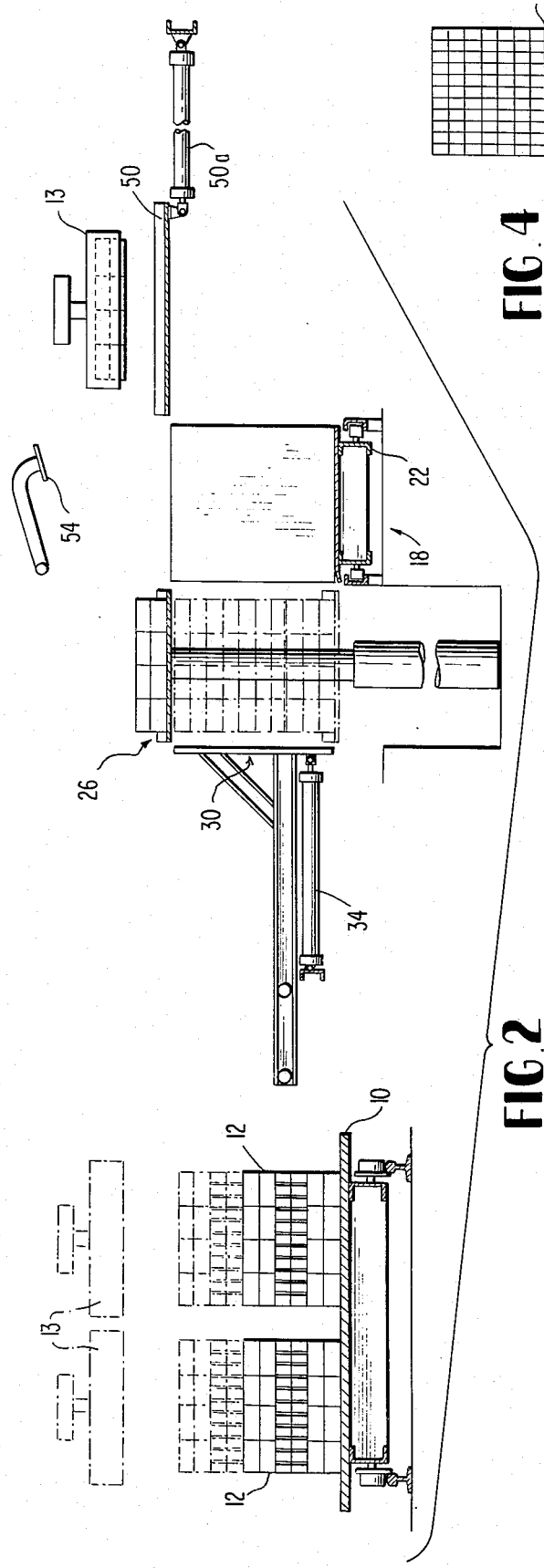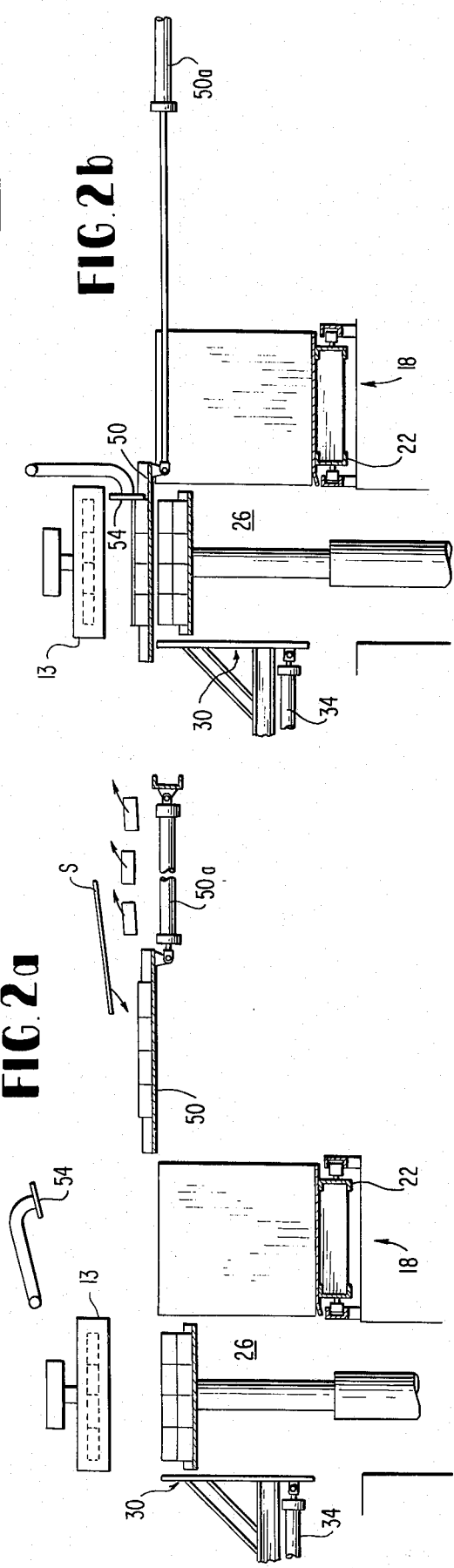

METHOD AND APPARATUS FOR FORMING BRICK PACKS WITH VOIDS

OBJECTS OF INVENTION

The present invention relates to method and apparatus for forming a stack of bricks of predetermined number and arrangement to ultimately be bundled by steel strapping so as to form a brick pack which may be handled for transportation and storage. One such brick pack may contain ten layers of brick with each layer comprising ten or eleven rows of bricks with each row containing four bricks. The method and apparatus of the present invention is further employed to form a pair of voids in one of the brick layers in the ultimate pack to accommodate the tines of a fork lift truck in handling the brick pack for storage and shipment.

One of the objects of the present invention is to provide such a method and apparatus for stacking bricks to form a brick pack of predetermined size which method and apparatus may be utilized in conjunction with existing brick handling and transportation systems utilized in commercial brick manufacturing plants after the bricks have been dried in a kiln. Included herein is the provision of such method and apparatus which may be substantially automated and yet are relatively simple in contrast to other automated systems presently available in the industry.

Another object of the present invention is to provide such a method and apparatus which may be employed in connection with existing kilns in the industry which do not have sufficient volume to justify fully automatic stacking systems, for example, as disclosed in my copending U.S. application Ser. No. 311,070, filed Dec. 1, 1972 wherein the tray conveyor system and automatic void forming mechanism are employed; the latter being avoided by the method and apparatus of the present invention. Included herein is the provision of such a method and apparatus which permits voids to be formed in the tine layer (tine course) of bricks manually by an operator without unduly sacrificing speed, efficiency and accuracy of operation.

A further object of the present invention is to provide such method and apparatus which may utilize conventional or existing brick gripping mechanisms presently employed in commercial kiln operations to remove or unload bricks from kiln cars. Included herein is the provision of such method and apparatus which do not require rearranging or renumbering the bricks in each layer as they exist on the kiln cars prior to stacking the layer of bricks to form the ultimate brick pack. Further included herein is the provision of such a method and apparatus which may be employed to stack bricks into a predetermined group for use in connection with conventional steel strapping mechanisms commercially available in the industry on the market.

A further object of the present invention is to provide such a method which may be implemented by apparatus that may be produced from generally standard stock items and which may utilize fluid actuators automatically controlled through limit switches and a control panel supervised by a single operator.

SUMMARY OF INVENTION

The above and other objects are achieved according to one particular version of the invention by stacking bricks in multiple layers onto two elevators positioned alongside each other on one side of a conveyor path at the inlet thereof. The layers or courses of brick are taken directly from stacks on a kiln car in a brick manufacturing plant, moved and deposited directly on the elevators until a predetermined number of layers has been stacked on the elevators. The present invention is particularly suitable for forming ultimate brick packs containing, for example, ten layers of brick with each layer except one layer (tine course) including eleven rows of brick with each row containing four bricks. The said tine layer contains two voids in two rows thereof for accommodating the tines of a fork lift truck. In commercial operations, the bricks while being dried in kilns are stacked in groups on flat kiln cars with each pair of successive layers in the stacks extending at right angles to its adjacent pair of layers, this being done in an effort to establish uniformity of brick exposure when being dried in the kiln.

According to the present invention, after the bricks leave the kiln, an overhead gripping mechanism employing tow gripping heads descends on the uppermost pairs of brick layers on two stacks on the kiln cars and removes the two uppermost layers from each of the stacks and then traverses over the two elevators, descends and deposits the two layers of bricks taken from each stack on the kiln car, on the two elevators, respectively. The overhead brick gripping mechanism itself, that is, apart from use in combination with other apparatus or steps of the present invention, forms no part of the present invention and is a commercial item available on the market. For disclosure purposes, however, reference may be had to United States Patents to Pearne No. 3,487,959 and Johnson No. 2,961,810 whose disclosures may be incorporated by reference to this application to suit the disclosure requirements of the patent laws. Inasmuch as successive pairs of layers of bricks are stacked on the kiln cars in orientations spaced 90° from each other, the overhead gripping mechanisms must not only be capable of vertical and horizontal movement when depositing the bricks on the elevators, but furthermore must be capable of rotating about a vertical axis 90° in order to stack all of the layers of the bricks on the elevators with the same orientation. Again, it is noted that such an overhead brick gripping mechanism is well-known in the brick stacking industry and is commercially available, and reference may be had to the aforementioned identified patents to Pearne and Johnson whose disclosures are hereby incorporated by reference into this application for satisfying the patent laws.

In order to form the voids, for example, in the third layer of bricks stacked on the elevator, a pair of horizontal plates are mounted for horizontal movement from an initial retracted position on one side of the conveyor path opposite the elevators, to an extended position overlying the elevators for purposes of depositing a layer of bricks with the voids formed therein onto the previously stacked layers on the elevators. The third layer to be stacked on the elevators and to contain the brick voids often termed "the tine layer" or "tine course" in the industry, is formed from bricks also taken from the stacks on the kiln car. In this operation, instead of the overhead gripping mechanism depositing the brick layers directly on the elevator, the overhead gripping mechanism traverses across the conveyor path to overlie the horizontally movable plates otherwise termed "the tine building plates." Only the lowermost layer held by the overhead gripping mechanism is deposited on the tine building plates whereupon an operator manually removes certain rows of bricks to form the voids. Additionally, as is well known in the brick handling industry, a sheet of plastic or wood is placed over the tine course of bricks after which the tine building plates are moved horizontally to overlie the elevators. The tine building plates are then retracted away from the elevators to their initial positions thereby depositing the tine layer on the previously stacked bricks on the elevators.

In order to prevent movement of the tine course laterally off the elevators when the tine building plates are retracted away from the elevators, a pair of vertical plates which may be termed "barrier plates" are moved downwardly from an overlying upper position to be interposed between one side of the elevator and the conveyor path to prevent such movement of the tine brick. The lower edges of the barrier plates terminate above the tine building plates permitting the tine building plates to be removed from overlying the elevator to deposit the tine brick and to move across the conveyor path to their initial positions. Any suitable actuating mechanisms preferably a fluid motor is employed to raise and lower the barrier plates. The overhead gripping mechanism which during the tine building operation continued to hold the upper layer of bricks removed from the stacks in the kiln car is then actuated to deposit on the upper layer the tine layer, to complete that particular phase of the operation. The overhead gripping mechanism then is moved back to continuous normal operation by removing two layers of bricks simultaneously from two stacks on the kiln cars and successively depositing them on the elevator until a predetermined number of layers (ten layers in the one particular brick pack disclosed) has been reached.

After the elevators have been stacked with a predetermined number of layers of bricks, the brick stacks on the elevators are transferred to a pair of shuttle cars fixed to each other to be movable simultaneously with each other from the inlet end of the conveyor path where it receives the brick stacks from the elevators to an outlet or discharge end of the conveyor path where the brick stacks are successively discharged from the shuttle cars for further processing at a steel strapping station where steel strapping is bound around the brick packs in well-known fashion. The spacing between the brick receiving portions of the shuttle cars are specifically designed such that they are aligned with the elevators when the shuttle cars are in the loading or initial position at the inlet of the conveyor path.

The brick stacks are removed from the elevators simultaneously by two pusher members movable in horizontal planes in a direction at right angles to the conveyor path to push the brick stacks from the elevators onto the shuttle cars. Preferably, fluid actuators or cylinders are employed for operating the pusher members forwardly for transferring the brick stacks and rearwardly for returning the pusher members for the next operation.

After the shuttle cars are loaded with the brick stacks from the elevators, the shuttle cars are then actuated along the conveyor path such as by means of a fluid cylinder or motor to position the first shuttle car in alignment with another vertical pusher member for transferring the stack of bricks from the first shuttle car transversely or laterally off the conveyor path and onto a second conveyor path for transporting the stack of bricks into a steel strapper. After the brick stacks are transferred from the first shuttle car onto the inlet of the strapper conveyor path, a vertical plate is descended behind the said transferred brick stack and moved horizontally to advance the brick stack along the strapper conveyor path. The shuttle cars are then indexed further in the direction along the original conveyor path to position the second shuttle car in alignment with the pusher member at the discharge station to transfer the stack of bricks from the second shuttle car to the inlet of the path of conveyance to the strapping station. The pusher member at the inlet of the strapping conveyance path having just been raised to permit discharge from the second shuttle car, is again lowered to advance the second stack of bricks along the strapper conveyor path thereby clearing the first conveyor path to permit the shuttle cars to be returned simultaneously alongside the elevators for the next operation.

DRAWINGS

Other objects and advantages of the present invention will become apparent from the following more detailed description of an embodiment of the invention taken in conjunction with the attached drawings in which:

FIG. 2 is a cross-sectional view taken generally along lines 2—2 of FIG. 1;

FIGS. 2a and 2b are fragmental cross-sectional views similar to FIG. 2 but showing successive steps in the void forming operation.

FIG. 4 is an elevational view of an ultimate commercial brick pack to be formed utilizing the present invention.

DETAILED DESCRIPTION

Figure 1:
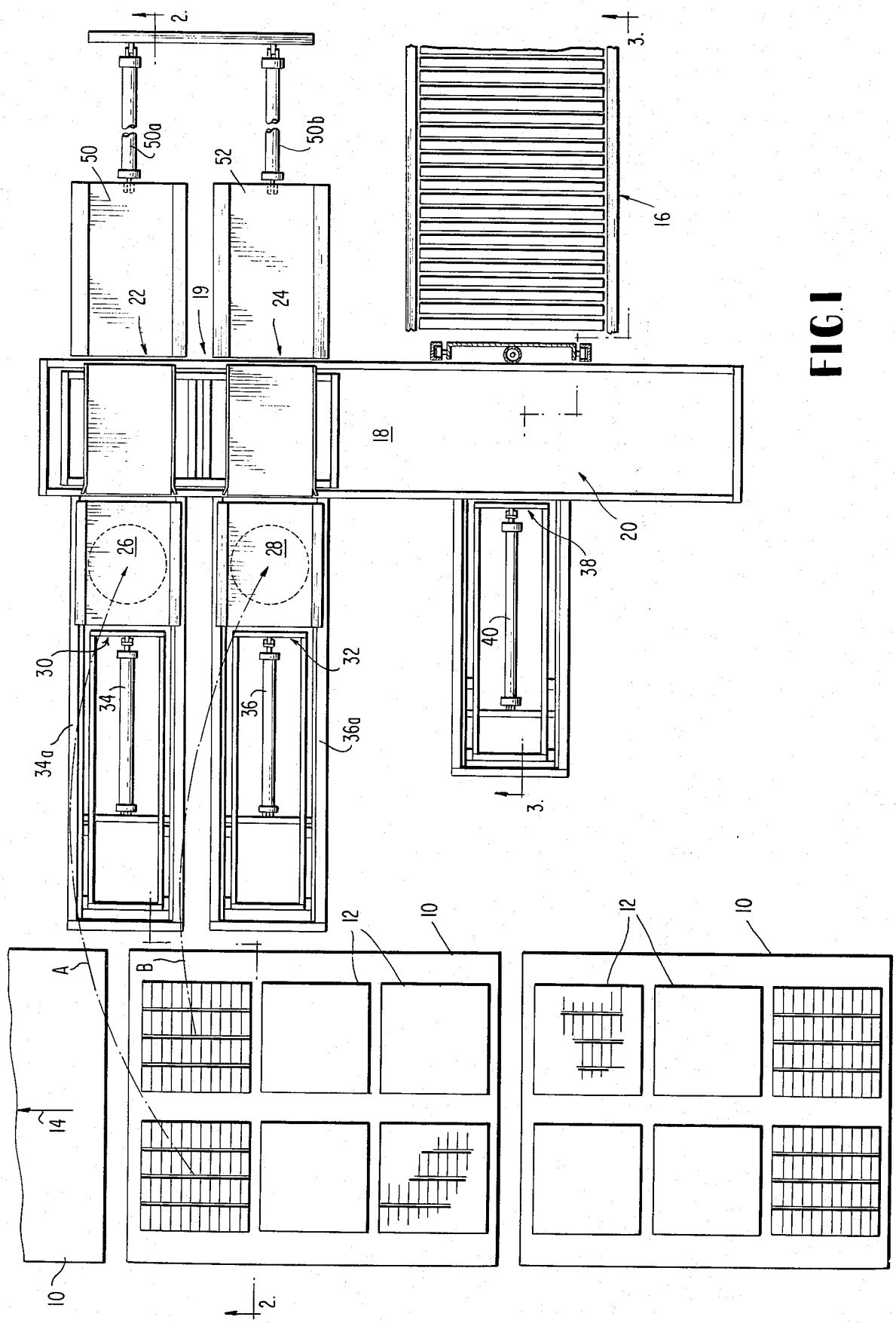
FIG. 1 is a plan view of a system including apparatus embodying the present invention for stacking bricks into a predetermined layered arrangement with voids formed in a certain layer of each stack prior to conveying the bricks to a strapping station where steel strapping is bound on the stacks to form an ultimate commercial brick pack for shipment and handling.

Referring now to the drawings in detail, there is shown in FIG. 1 a system embodying the present invention for taking bricks directly from a kiln car generally designated 10 and stacking the same into commercial brick backs, for example, disclosed in my co-pending U.S. application Ser. No. 311,070 filed Dec. 1, 1972, and then conveying the stack to a strapping staion 16 wherein the stacks are conventionally bound with steel strapping for shipment purposes. FIG. 4 also shows such a brick pack. As noted in FIG. 1, the bricks are stacked in a plurality of groups generally designated 12 on the kiln car 10 for purposes of introducing the bricks into the kilns during the drying operation. FIGS. 1 and 2 illustrates a commercial kiln car arrangement of the bricks in each group 12 wherein each pair of successive brick layers is oriented 90° from the adjacent pair. It will also be noted from FIGS. 1 and 4 that in the particular embodiment shown, each layer of bricks contains eleven rows with each row containing four bricks. When emerging from the kiln (not shown), the kiln cars 10 move along usually a fixed path or track generally in a direction designated by arrow 14 in the shown drawings.

The brick layers are simultaneously taken from two groups 12 of bricks on the kiln car 10 and directly transferred on elevators generally designated 26 and 28 positioned alongside a conveyor path generally designated 18 at the inlet end of the conveyor path generally designated 19. After a predetermined number of layers have been stacked on the elevators 26 and 28, and voids have been formed in certain layers as will be described, the bricks are transferred simultaneously onto shuttle cars 22 and 24 fixed to each other to be movable along the conveyor path to a discharge station 20. The stacks of bricks are then sequentially transferred from the shuttle cars away from the conveyor path 18 at the discharge station 20 towards a steel strapping station generally designated 16. In transferring the bricks from the shuttle cars 22 and 24, at the discharge station 20 to the steel strapping station 16, the shuttle cars are sequentially moved into position at the discharge station 20 to permit a single pusher member generally designated 38 to push the bricks from the shuttle cars off the conveyor path to steel strapping station 16 as shown in FIGS. 3 to 3b.

As noted above, two layers of bricks are simultaneously removed from two groups 12 of bricks on kiln car 10 and deposited on elevators 26 and 28 simultaneously by overhead gripping mechanisms 13 well-known and commercially available in the industry, again reference being had to U.S. Pat. Nos. 3,487,959 and 2,961,810 whose teachings are hereby incorporated by reference into this application. Dotted lines A and B in FIG. 1 of the drawings indicate the movement of the gripping mechanisms in transferring bricks from groups 12 on the kiln car 10 to elevators 26 and 28. In view of the fact that the layers of bricks when stacked on the elevators and as arranged in the ultimate brick pack, must all have the same orientation, it is necessary that the brick gripping mechanisms rotate 90° every other pair of brick layers taken from groups 12 prior to depositing them on the elevators in view of the 90° angular spacing between successive pairs of layers as indicated in FIG. 2 and as noted above. Gripping heads 13 are preferably designated to be able to move relative to each other to increase or decrease the spacing therebetween to accommodate rotation of the bricks if needed or in instances where the centers between the brick stacks on the kiln car 10 are not exactly the same as the centers between elevators 26.

Elevators 26 and 28 themselves may be supplied by any conventional elevators having horizontal platforms and being lowerable in increments after receiving each load of bricks from the overhead gripping mechanism. The elevators are preferably actuated by fluid cylinders or motors, and also limit switches may be provided for initiating operation of vertically oriented pusher members 30 and 32 for transferring the bricks from the elevators 26 and 28 onto shuttle cars 22 and 24. That is to say, when elevators 26 and 28 are sufficiently lowered after receiving a predetermined number of brick layers, a limit switch is actuated to control actuation of fluid cylinders 34 and 36 connected to pusher plates 30 and 32 to actuate the same horizontally across the elevator platforms to push the bricks from the elevators simultaneously onto shuttle cars 22 and 24. When fluid motors 34 and 36 have been sufficiently extended for transferring the bricks to the shuttle cars 22 and 24, other limit switches are actuated to return the fluid motors 34 and 36 in their initial position shown in FIG. 1. This limit switch may also be employed to initiate transportation of the shuttle cars 22 and 24 along conveyor path 18 towards discharge station 20. The above mentioned limit switches and fluid control system for operating the various fluid motors or cylinders need not be described since they may be conventional and would be apparent to one having ordinary skill in this art without further disclosure.

Any suitable means for mounting pusher members 28 and 30 and tine building plates 50 and 52 (to be described) for rectilinear horizontal movement may be employed including guide rails 34a, 36a and 50a and 50b. Also, fluid actuators or motors 50a, 50b are employed for moving tine building plates 50 and 52 between the extended and retracted positions thereof. In this latter regard, it should be noted that the operation of the various parts of the apparatus would be automatic except for the tine building operation where the operator who builds the tine course would, through push-button control, operate the tine building plates 50 and 52 to move them over the elevators 26 and 28 and then to retract them to the tine course as will be described. A control panel (not shown) is provided adjacent the operator to stop any of the phases of operation in order to accommodate the tine building operation.

In accordance with one of the aspects of the invention, and in the specific embodiments shown, after two layers of brick have been deposited on the elevators 26 and 28, the next two layers of bricks removed from stacks 12 on the kiln car are brought beyond the elevators to overlie horizontal tine building plates 50 and 52, (see FIG. 2) this being controlled by the tine building operator through the push-button control panel, for example. The lowermost layers in each of the two layers held by the gripping mechanism 13 are then deposited on the tine building plates 50 and 52 respectively, whereupon the tine operator manually removes bricks (see FIG. 2a) from these lower layers while on the plates 50 and 52 to form the desired voids. Sheet materials such as plastic or wooden boards of thin caliber are then placed over the tine course whereupon the operator presses the appropriate button on the control panel to actuate plates 50 and 52 to move across the conveyor path 18 over the shuttle cars 22 and 24 to overlie the elevators 26 and 28 as shown in FIG. 2b.

Overhead vertical barrier plates 54 (one shown) are then actuated to descend between elevators 26 and 28 and the shuttle cars 22 and 24 positioned at the inlet 19 of conveyor path 18. The operator then presses the appropriate control button to retract tine building plates 50 and 52 out from under the tine courses thereby depositing the latter on the previously stacked layers of bricks on elevators 26 and 28. The overhead gripping mechanism 13 is then actuated to deposit on the tine course the upper layer of bricks which during the tine building operation remained in the grasp of the gripping mechanism, overlying the elevators where the gripping mechanism returned after depositing the lower layer on plates 50, 52. Normal operation is then resumed whereupon the gripping mechanism continues to successively deposit two layers from two groups 12 on kiln car 10 onto the two elevators 26 and 28 simultaneously until a predetermined number (ten stacks, for example) is reached on elevators 26 and 28. Fluid cylinders 34 and 36 are then actuated to push the brick stacks from elevators 26 and 28 onto the shuttle cars 22 and 24 which are properly positioned to receive the latter at the inlet station 19.

Figure 3A:
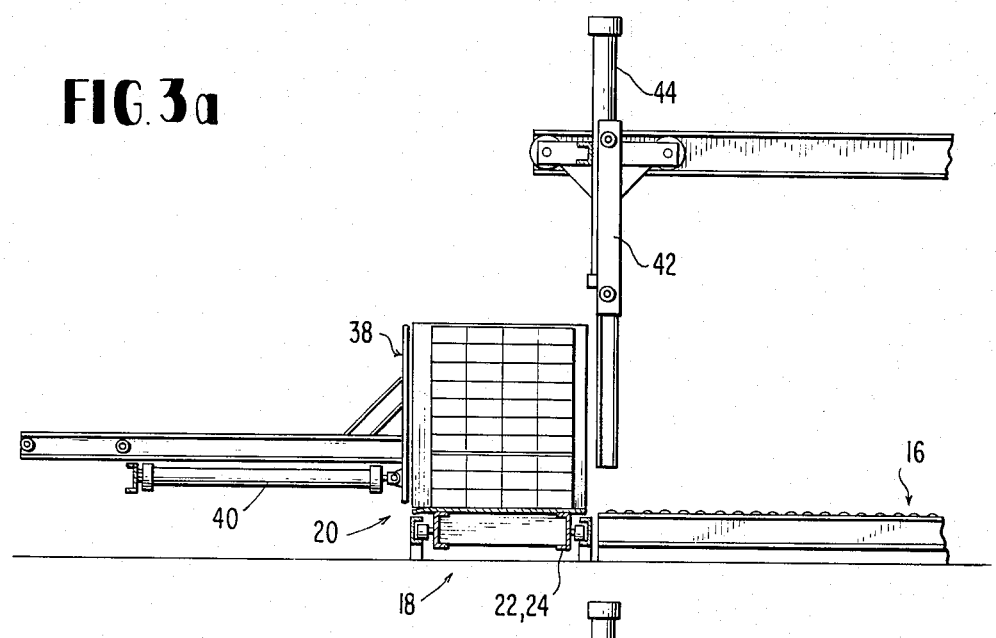
FIGS. 3, 3a and 3b are cross-sectional views taken generally along lines 3—3 of FIG. 1 illustrating the parts in successive stages of operation.
Figure 3B:
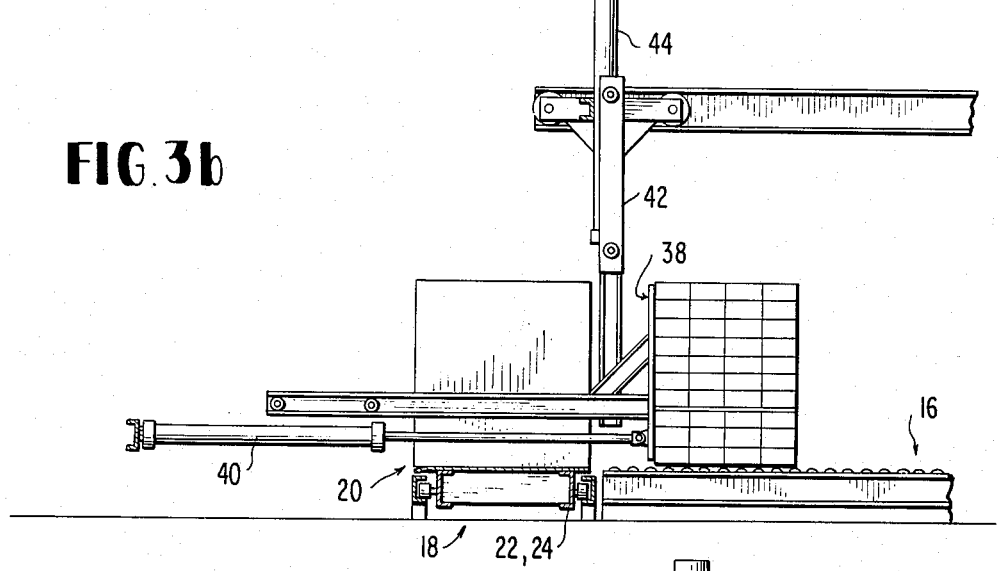
Figure 3C:
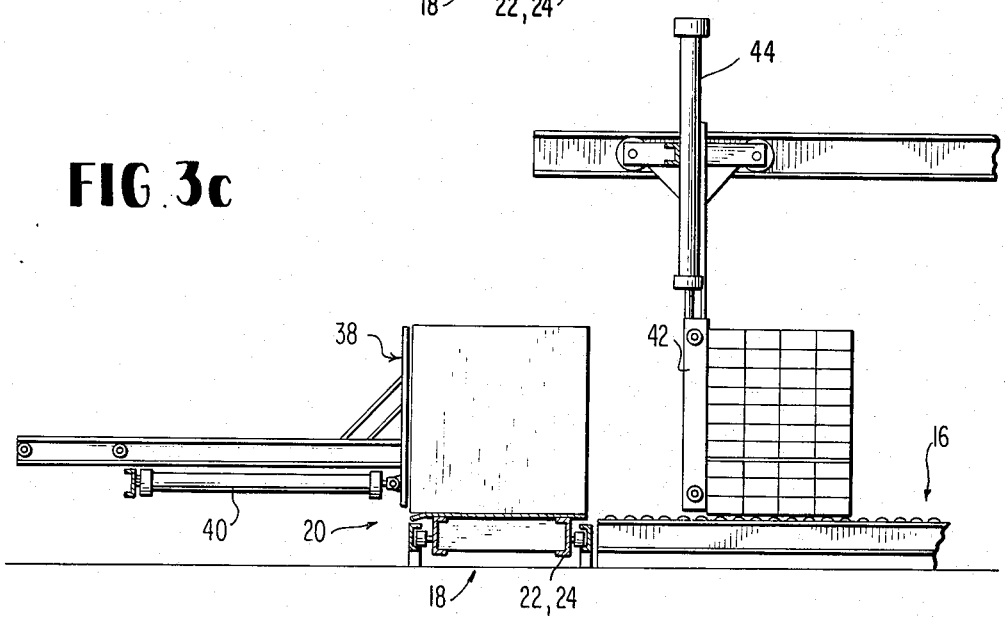

Shuttle cars 22 and 24 are also actuated by any suitable fluid motor to initially bring shuttle car 24 into alignment with pusher member 38 situated at the discharge station 20 (see FIG. 3a). In this position of shuttle car 24 the bricks stacked thereon are in alignment with the inlet to steel strapping station 16. Fluid actuator 40 is then actuated to cause pusher member 38 to move transversely over shuttle path 18 to push the bricks stacked on shuttle car 24 onto the inlet to the strapping station (see FIG. 3b). Actuator 40 is then actuated to retract pusher 38 to its initial position to permit the unloading of the other shuttle car 22.

In order to ensure that the bricks transferred onto inlet 16 clears the conveyor path 18 to permit subsequent indexing movement of the shuttle cars along path 18 to position shuttle car 22 in registry with pusher member 38, a vertical pusher member 42 is lowered from a raised idle position to a lower use position at one side of conveyor path 18 opposite pusher 38. Pusher member 42 is then moved horizontally towards the strapper to advance the stack of bricks further towards the strapper (see FIG. 3c). The conveyor path 18 is thus cleared whereby shuttle cars 22 and 24 are indexed to further advance them along conveyor path 18 until the shuttle car 22 registers with pusher member 38. Fluid actuator 40 is then actuated to again cause extension of pusher member 38 to transfer the bricks stacked on shuttle car 22 onto the inlet 16 to the strapping station whereupon pusher member 42 which just previously was raised to the idle position is again lowered to a position behind the brick stack whereupon pusher member 42 is moved horizontally to further advance the stack of bricks towards the steel strapper. Shuttle cars 22 and 24 are then returned simultaneously to the inlet 19 of the conveyor path to be in registry with elevators 26 and 28 for receiving the next stacks of bricks from elevators 26 and 28.

Barrier plates 54 used to deposit the tine course on the elevators are normally raised sufficiently above the elevators and shuttle cars to permit transfer of the brick stacks from the elevators to the shuttle cars. However, when in their lowermost operative positions, barrier plates 26, 28 are spaced slightly above horizontal plates 50 and 52 to permit the latter to be withdrawn from over the elevators to deposit the tine course of bricks on the elevators. Barrier plates 54 are also actuated by fluid motors, (not shown).

It will be seen from the above that with the exception of the manual removal of the bricks from plates 50 and 52 to form the voids in the tine courses, the above operation may be fully automated through the use of limit switches governing the actuation of the various fluid motors. The present invention provides a relatively simple but substantially fully automated system for removing bricks from a kiln car and directly depositing them on elevators to stack the same into a predetermined layered pack.

It should be understood that although the present invention has been described in terms of employing two distinct elevators, two distinct tine course building plates 50 and 52 and two distinct shuttle cars, that the apparatus may be modified so that a single elevator having an enlarged platform which could accommodate two stacks of bricks may be employed. The same is true with respect to the shuttle cars where a single shuttle car platform of sufficiently large dimension could be employed for accommodating two stacks of bricks transferred from the elevators. Similarly, instead of the two distinct tine course plates 50 and 52 disclosed, a single tine course building plate of sufficiently large dimension to accommodate two tine layers could be employed in carrying out the present invention, and the latter should therefore not be construed as limited to the specific embodiments disclosed. Additionally, although certain terms such as "plates" have been utilized to define certain structural parts of the invention, for example, plates 50, 52, it is to be understood that these terms are to be given their broadest meaning so as to include any member or members capable of performing the same function. In the case of members 50 and 52, these may be formed by a single member having a planar surface or a plurality of members joined together to present a planar surface.

What is claimed is:

1. A method of stacking bricks to form brick packs of predetermined layers, the steps comprising in combination: simultaneously taking from a source of at least two groups of bricks each group including at least one layer of bricks and placing the groups on a pair of elevators situated in side-by-side relationship on one side of a conveyor path, successively taking additional groups of bricks from the source and directly stacking them on the elevators respectively, until a predetermined number of layers have been stacked on the elevators, transferring the stacked bricks from the elevators onto a pair of shuttle cars fixed to each other to be movable along the conveyor path, moving the shuttle cars together along the conveyor path until one shuttle car arrives at a discharge station for introducing the bricks into a further processing station such as a strapping station, transferring the bricks from the one shuttle car off the side of the conveyor path towards said steel strapping station, further moving the shuttle cars along said path until the other shuttle car is registered at said discharge station, removing the bricks from the other shuttle car off the side of the conveyor path towards said strapping station, returning the shuttle cars to their original positions adjacent said elevators, and repeating the above steps, and wherein there is further included the steps of taking certain brick layers from said two groups of bricks at said source and depositing them on horizontal plates situated on the side of the conveyor path opposite the elevators, removing certain bricks therefrom to form voids in said certain layers, moving said plates over said elevator and then withdrawing said plates to deposit said certain layers with the voids therein on the elevator.

2. The method defined in claim 1 wherein the source of bricks is two groups of stacked bricks on a kiln car.

3. The method defined in claim 1 wherein after the bricks are removed from the conveyor path a vertical pusher member is lowered behind the bricks and moved horizontally to advance the bricks away from the conveyor path.

4. The method defined in claim 1 wherein an overhead gripping mechanism containing two gripping heads is employed to transport the bricks from the source to the elevators.

5. The method defined in claim 1 wherein some of the layers of bricks are rotated 90° from their orientation at said source prior to depositing them on the elevators.

6. The method defined in claim 1 further including the step of lowering vertical barrier members between the elevators and the conveyor path prior to removing the plates to deposit the layers of bricks with the voids therein on the elevators, the barrier plates serving to prevent movement of said certain layers of bricks with the voids therein in the direction of movement of the plates away from the elevators across the conveyor path.

7. A method of stacking bricks to form a multilayered pack of bricks containing voids in certain layers thereof to accommodate the tines of a fork lift truck, the method comprising in combination the steps of: sequentially removing layers of brick from a source and directly depositing the same on top of one another on an elevator to form a stack of bricks containing a predetermined number of layers and wherein one of said layers has a pair of voids formed therein for accommodating the forks of a tine lift truck, the voids in said one layer being formed by removing a layer of bricks from the source and depositing the same on a horizontal plate situated adjacent to said elevator, removing bricks from said one layer while on said plate to form said voids, moving said plate to overlie said elevator, and withdrawing said plate away from the elevator to deposit said one layer with the voids therein on the elevator.

8. The method defined in claim 7 wherein prior to withdrawing the plate away from the elevator to deposit said one layer of bricks with the voids therein, a barrier plate is lowered to one side of the elevator to prevent said one layer with the voids therein from moving in the direction of the plate when the plate moves away from the elevator to deposit said one layer with the voids therein on the elevator.

9. The method defined in claim 7 wherein bricks are stacked on the elevator in two layers, wherein the voids are formed in one layer by removing two layers of brick from said source and depositing the lower of the two layers on the plate for forming voids therein and wherein after the layer with the voids therein is deposited on the elevator the remaining layer in said two layers is deposited on top of the layer with the voids.

10. Apparatus for stacking bricks to form a pack of bricks having a predetermined number of layers therein, the apparatus comprising in combination: a conveyor path having an inlet station and a discharge station spaced from the inlet station along the conveyor path, a pair of shuttle cars movable along said conveyor path, said shuttle cars being fixed to each other in predetermined spaced relationship to be movable in unison along said conveyor path, a pair of elevators situated generally at the inlet station on one side of the conveyor path to receive layers of bricks thereon successively until a predetermined number of layers is stacked thereon to form two brick packs, means for transferring stacks of bricks from said elevators onto said shuttle cars, means for moving said shuttle cars in unison along said conveyor path to successively align said brick packs at the discharge station, means at the discharge station for transferring the brick packs from the shuttle cars laterally of the conveyor path, and wherein there is further included a pair of horizontal plates situated on one side of said conveyor path opposite the elevators for receiving bricks thereon to form layers of bricks with voids therein, means for moving said plates in a horizontal plane to overlie said elevators, means for retracting said plates away from the elevators for depositing bricks on said elevators with voids therein.

11. Apparatus defined in claim 10 further including a pair of barrier plates movable in a vertical plane between the conveyor path and the elevators to contain bricks deposited on the elevator from said plates against movement horizontally off the elevators when the plates are retracted away from the elevators.

12. Apparatus defined in claim 10 further including a source of bricks including two groups of stacked bricks on a kiln car movable along a path parallel to said first conveyor path, and wherein there is further included brick gripping means for removing layers of bricks from the groups of the kiln car and depositing them directly on the elevators, said brick gripping means and said plates being aligned along the same path and said brick gripping means being movable over said plates to deposit certain layers of brick from said source on to the plates to have voids formed therein.

13. Apparatus defined in claim 10 wherein said means for transferring bricks from the elevators to the shuttle cars include a pair of horizontally movable pusher members and wherein said means at the discharge station for transferring bricks includes a third horizontally movable pusher member.

14. Apparatus for stacking bricks to form a multi-layered pack of bricks containing voids in certain layers thereof to accommodate the tines of a fork lift truck, the apparatus comprising in combination, an elevator having a horizontal platform, brick gripping means for sequentially removing layers of brick from a source and moving in a horizontal plane in one direction and then depositing the same on top of one another on the elevator platform to form a stack of bricks, a horizontal plate situated adjacent the elevator in alignment with said one direction for holding a layer of bricks thereon with said layer having voids formed in certain rows thereof, means mounting the horizontal plate for movement in a horizontal plane parallel to said one direction and overlying the elevator platform and the layers of bricks stacked on the elevator platform, and for retracting movement away from the elevator platform to deposit the layer of bricks with the voids therein on the previously stacked layer on the elevator, and a stop member adapted to overlie said plate when the plate overlies the elevator platform to prevent movement of the bricks on said plate in the direction of retraction of said plate when the plate is retracted to deposit the layer with the voids therein on the elevator and wherein said brick gripping means is also movable in said one direction over said plate when the plate is in retracted position for depositing a layer of bricks from said source on the plate to have voids formed therein.

* * * * *